United States Patent
Nomura

(10) Patent No.: US 10,464,248 B2
(45) Date of Patent: Nov. 5, 2019

(54) RUBBER-COATING DEVICE FOR STEEL WIRE

(71) Applicants: FUJI SEIKO CO., LTD., Hashima-shi, Gifu-ken (JP); FUJI SHOJI CO., LTD., Hashima-shi, Gifu-ken (JP)

(72) Inventor: Shigeaki Nomura, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 362 days.

(21) Appl. No.: 15/329,723

(22) PCT Filed: Aug. 4, 2014

(86) PCT No.: PCT/JP2014/070466
§ 371 (c)(1),
(2) Date: Jan. 27, 2017

(87) PCT Pub. No.: WO2016/020967
PCT Pub. Date: Feb. 11, 2016

(65) Prior Publication Data
US 2017/0210049 A1    Jul. 27, 2017

(51) Int. Cl.
| | | |
|---|---|---|
| B29B 15/14 | (2006.01) | |
| B29C 47/02 | (2006.01) | |
| B29C 47/78 | (2006.01) | |
| B29C 48/15 | (2019.01) | |
| B29D 30/48 | (2006.01) | |

(Continued)

(52) U.S. Cl.
CPC .............. *B29C 48/15* (2019.02); *B29B 15/14* (2013.01); *B29D 30/48* (2013.01); *B65H 59/38* (2013.01); *H01B 13/06* (2013.01); *B29C 48/05* (2019.02); *B29C 48/154* (2019.02); *B29C 48/79* (2019.02); *B29D 30/06* (2013.01);
(Continued)

(58) Field of Classification Search
CPC ....... B29C 48/05; B29C 48/15; B29C 48/154; B29C 48/34; B29C 48/79; B29B 15/14
See application file for complete search history.

(56) References Cited

U.S. PATENT DOCUMENTS 2,331,139 A * 10/1943 Safford
2,564,784 A *  8/1951 Jones
(Continued)

FOREIGN PATENT DOCUMENTS

JP        48-96668 A      12/1973
JP      2004-345312 A    12/2004
(Continued)

OTHER PUBLICATIONS

International Preliminary Report on Patentability for Application No. PCT/JP2014/070466 dated Feb. 7, 2017.
(Continued)

*Primary Examiner* — Joseph S Del Sole
*Assistant Examiner* — Joseph S Leyson
(74) *Attorney, Agent, or Firm* — Tarolli, Sundheim, Covell & Tummino LLP

(57) ABSTRACT

A rubber-coating device for a steel wire is provided with: a heating device for heating water to a specified temperature range; heat transfer rollers, which contact the steel wire and inside which a water passage is formed; and an extruder for coating rubber on the steel wire that is heated by the heat transfer rollers.

4 Claims, 3 Drawing Sheets

(51) Int. Cl.
    *B65H 59/38*     (2006.01)
    *H01B 13/06*     (2006.01)
    *B29K 19/00*     (2006.01)
    *B29K 21/00*     (2006.01)
    *B29D 30/06*     (2006.01)
    *B29C 48/05*     (2019.01)
    *B29C 48/154*     (2019.01)
    *B29C 48/79*     (2019.01)

(52) U.S. Cl.
    CPC .... *B29D 2030/483* (2013.01); *B29K 2019/00* (2013.01); *B29K 2021/00* (2013.01)

(56) References Cited

U.S. PATENT DOCUMENTS 2,642,898 A * 6/1953 Acock et al.
3,488,808 A * 1/1970 Gibney

FOREIGN PATENT DOCUMENTS

| JP | 2009-285939 A | 10/2009 |
|---|---|---|
| WO | 2000/035667 A1 | 6/2000 |

OTHER PUBLICATIONS

International Search Report for Application No. PCT/JP2014/070466 dated Sep. 2, 2014.

* cited by examiner

RUBBER-COATING DEVICE FOR STEEL WIRE

RELATED APPLICATIONS

The present invention is a U.S. National Stage under 35 USC 371 patent application, claiming priority to Serial No. PCT/JP2014/070466, filed on 4 Aug. 2014; the entirety of which is incorporated herein by reference.

TECHNICAL FIELD

The present invention relates to a steel wire rubber coating device that coats a steel wire for a bead core with rubber.

BACKGROUND ART

A coating device known in the art coats a steel wire for a bead core with rubber. For example, patent document 1 discloses a rubber coating device that heats a steel wire using an electromagnetic induction heating coil or a coil heater and extrudes rubber to the heated steel wire. The steel wire is heated in advance. Thus, the rubber contacting the steel wire is softened by heat and applied to the steel wire. This coats the steel wire with the rubber.

PRIOR ART DOCUMENT

Patent Document

Patent Document 1: Japanese Laid-Open Patent Publication No. 2004-345312

SUMMARY OF THE INVENTION

Problems that the Invention is to Solve

An excessively high temperature of the steel wire during the application of the rubber may denature the rubber. After coating the steel wire with rubber, the rubber coating device of patent document 1 controls the heating temperature of the steel wire in accordance with the diameter of the rubber coating. However, for example, when the feeding of the steel wire temporarily stops, the rubber coating diameter at the portion where the coating diameter is measured does not change. Thus, the heating temperature is not controlled. Further, even when the temperature exceeds the suitable range, the heating temperature is not controlled unless the rubber coating diameter changes. Thus, the temperature of the steel wire may exceed the suitable range and denature the rubber.

It is an object of the present invention to provide a steel wire rubber coating device that easily maintains the temperature of a steel wire in a suitable range.

Means for Solving the Problems

To achieve the above object, a rubber coating device for a steel wire includes a heating device that heats a heat medium to a predetermined temperature range, a heat transfer member that is in contact with a steel wire and includes a space for the heat medium, and an extrusion machine that coats the steel wire heated by the heat transfer member with rubber.

In the above structure, the heat transfer member heated by the heat medium transmits heat to the steel wire. The heating device heats the heat medium to the predetermined temperature range. Thus, the temperatures of the heat transfer member and the steel wire do not exceed the temperature of the heat medium. This allows the temperature of the steel wire to be easily maintained in the suitable range.

Effect of the Invention

The present steel wire rubber coating device easily maintains the temperature of a steel wire in the suitable range.

EMBODIMENTS OF THE INVENTION

One embodiment of a steel wire rubber coating device will now be described.

Figure 1:
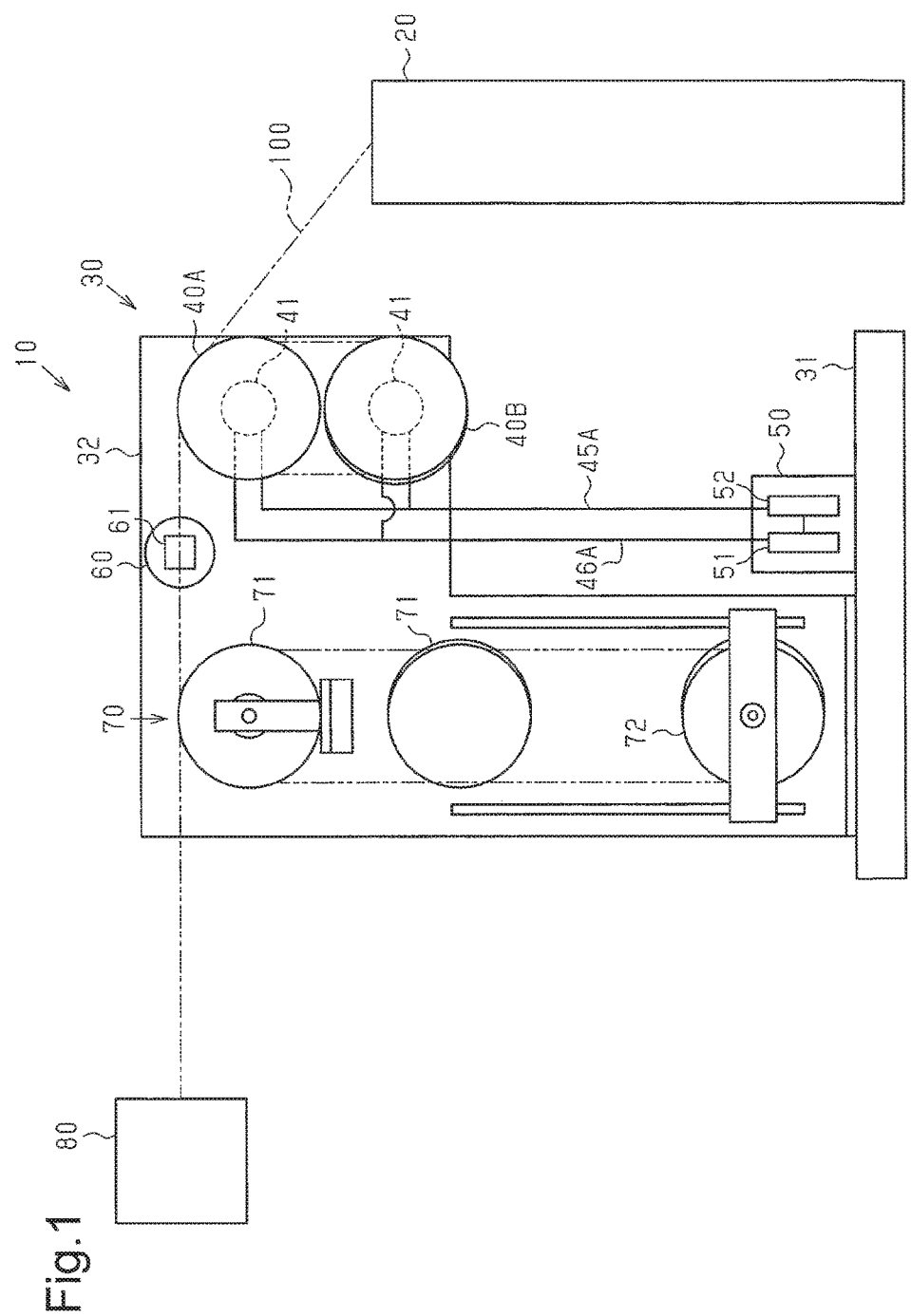
FIG. 1 is a front view showing a bead core formation apparatus according to one embodiment of the present invention.

As shown in FIG. 1, a bead core formation apparatus 10 includes a feed device 20 that feeds a steel wire 100, a rubber coating device 30 that coats the steel wire 100 with rubber, a festoon device 70 that adjusts tension of the steel wire 100, and a former 80 that forms a bead core by winding the steel wire 100 that is coated with rubber.

The rubber coating device 30 includes a base 31, a support plate 32 projecting from the base 31, a first heat transfer roller 40A that is a heat transfer member, a second heat transfer roller 40B that is a heat transfer member, a heating device 50 that heats the heat transfer rollers 40A and 40B, and an extrusion machine 60 that coats the steel wire 100 with rubber.

Figure 2:
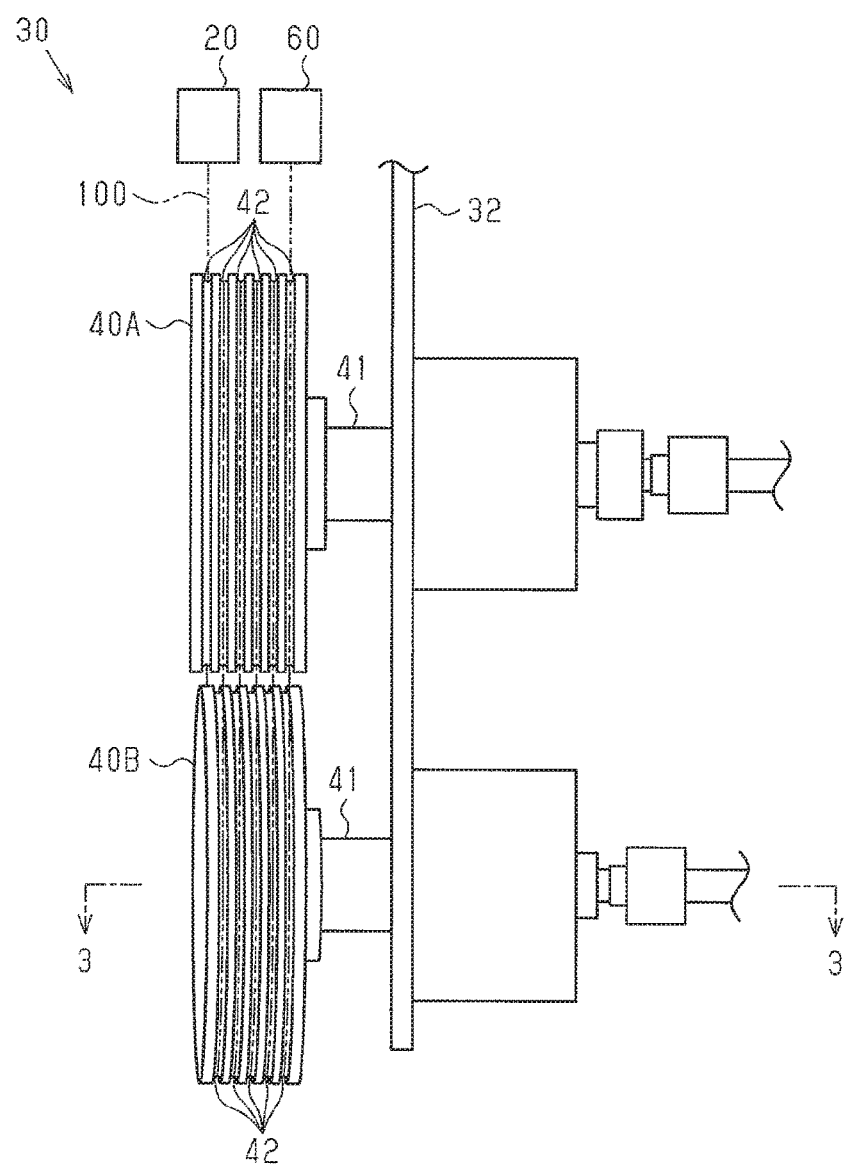
FIG. 2 is a side view showing heat transfer rollers of the bead core formation apparatus.

As shown in FIG. 2, the two heat transfer rollers 40A and 40B each include a rotation shaft 41 projecting from the support plate 32. Each rotation shaft 41 is rotationally coupled to the support plate 32. The two heat transfer rollers 40A and 40B are arranged in the vertical direction. The outer circumferential surface of each of the heat transfer rollers 40A and 40B includes grooves 42. The grooves 42 are arranged in the axial direction of the rotation shafts 41. The axial direction of the second heat transfer roller 40B is inclined relative to the axial direction of the first heat transfer roller 40A. Thus, the grooves 42 of the second heat transfer roller 40B are inclined relative to the grooves 42 of the first heat transfer roller 40A.

The steel wire 100 is fed from the feed device 20 and then wound around the groove 42 of the first heat transfer roller 40A that is farthest from the support plate 32 (hereinafter referred to as the frontmost groove 42). Subsequently, the steel wire 100 is wound around the frontmost groove 42 of the second heat transfer roller 40B and then rewound around the first heat transfer roller 40A. As described above, the grooves 42 of the second heat transfer roller 40B are inclined relative to the grooves 42 of the first heat transfer roller 40A. Thus, when the steel wire 100 is wound around the grooves 42 of the second heat transfer roller 40B and then rewound around the first heat transfer roller 40A, the steel wire 100 is wound around the groove 42 that is adjacent to the rear side of the groove 42 around which the steel wire 100 was previously wound. In this manner, the steel wire 100 is sequentially wound around the grooves 42 of the first heat transfer roller 40A and the grooves 42 of the second heat transfer roller 40B from the front side toward the rear side. The steel wire 100 extends in the vertical direction between the first heat transfer roller 40A and the second heat transfer roller 40B. That is, the steel wire 100 extends obliquely relative to the axial direction of the heat transfer roller 40A and the heat transfer roller 40B between the heat transfer rollers 40A and 40B. This limits twisting of the steel wire 100 at a portion between the heat transfer rollers 40A and 40B. The steel wire 100 is wound around the rearmost groove 42 of the first heat transfer roller 40A and then sent to the extrusion machine 60.

Figure 3:
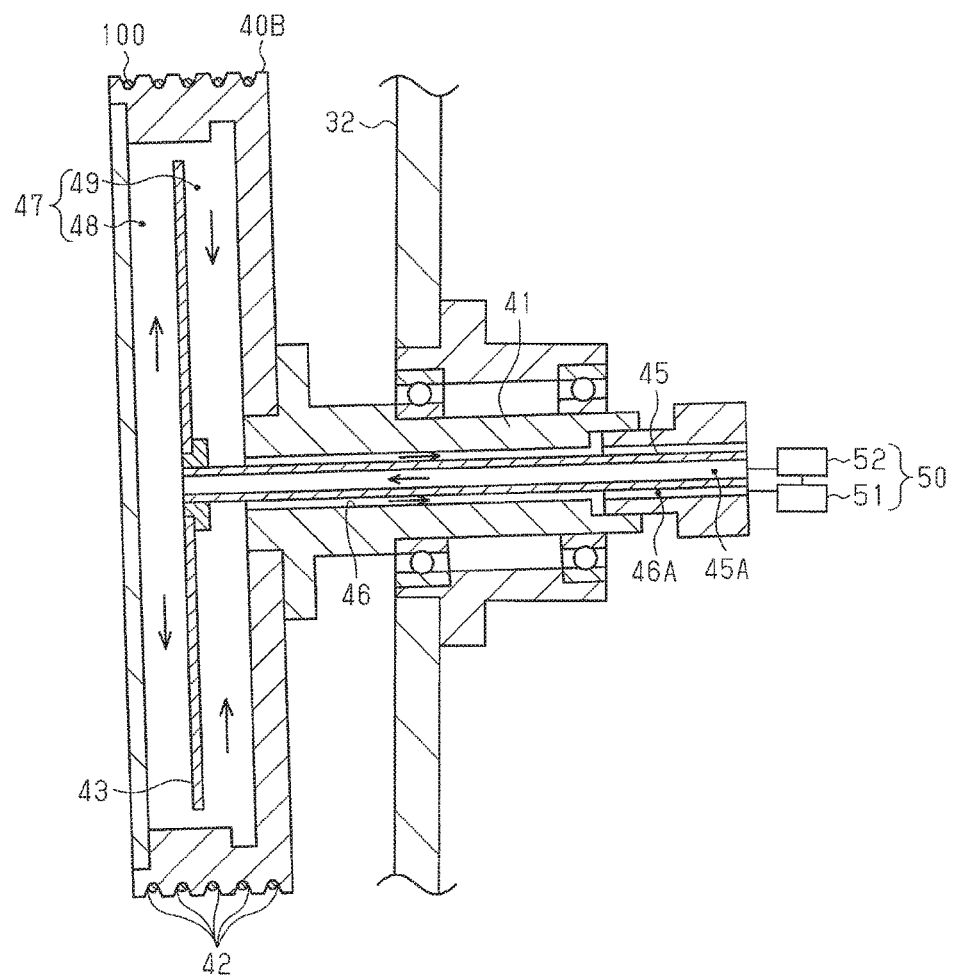
FIG. 3 is a cross-sectional view taken along line 3-3 in FIG. 2.

The internal structures of the heat transfer rollers 40A and 40B will now be described with reference to FIG. 3. The first heat transfer roller 40A and the second heat transfer roller 40B have the same internal structure. Thus, the first heat transfer roller 40A is not illustrated.

The heat transfer rollers 40A and 40B each include a heating chamber 47, which is a space for a heat medium. A circular partition plate 43, which is concentric to the heat transfer rollers 40A and 40B, is arranged in the heating chamber 47. The partition plate 43 partitions the heating chamber 47 into a first heating chamber 48, which is located at the front side, and a second heating chamber 49, which is located at the rear side. The outer circumferential portion of the first heating chamber 48 is in communication with the outer circumferential portion of the second heating chamber 49.

The rotation shaft 41 of each of the heat transfer rollers 40A and 40B includes a discharge bore 46 that extends in the axial direction. A supply pipe 45 extending in the axial direction is arranged in the discharge bore 46. The supply pipe 45 includes a front end connected to the partition plate 43 in the heating chamber 47.

The supply pipe 45 forms part of a supply passage 45A that supplies water, which is a heat medium, to the first heating chamber 48. The space between the discharge bore 46 and the supply pipe 45 forms part of a discharge passage 46A that discharges the water supplied to the second heating chamber 49 out of the heating chamber 47.

The supply passage 45A and the discharge passage 46A are connected to the heating device 50. The heating device 50 includes a pump 51 and a heater 52. The pump 51 pressurizes water and sends the water to the supply passage 45A. The heater 52 heats the water pressurized by the pump 51 to a predetermined temperature range, the upper limit of which is the boiling point of the pressurized water. It is preferred that the predetermined temperature range be from 100° C. to 110° C. The heater 52 is, for example, an electric heater.

Water sequentially flows through the supply passage 45A, the first heating chamber 48, the portion communicating with the first heating chamber 48 and the second heating chamber 49 proximate to the grooves 42, the second heating chamber 49, and into the discharge passage 46A. The water flowing into the discharge passage 46A is returned to the heating device 50, heated again, and sent to the supply passage 45A. The water transfers heat to the heat transfer rollers 40A and 40B.

As shown in FIG. 1, the steel wire 100 contacts the heat transfer rollers 40A and 40B and receives heat from the heat transfer rollers 40A and 40B. Then, the steel wire 100 passes through the head 61 of the extrusion machine 60. The head 61 extrudes pre-vulcanized rubber onto the outer circumferential surface of the steel wire 100. The rubber applied to the heated steel wire 100 coats the surface of the steel wire 100.

The steel wire 100 coated with rubber is wound around two cooling rollers 71 of the festoon device 70.

The two cooling rollers 71 are arranged in the vertical direction and coupled to the support plate 32. The two cooling rollers 71 each include a coolant passage (not shown). Thus, the rubber applied to the steel wire 100 is cooled and hardened while moving around the two cooling rollers 71.

The festoon device 70 includes an adjustment roller 72 that is located below the lower cooling roller 71. The steel wire 100, which is coated with rubber, is wound around the two cooling rollers 71 a number of times and then wound around the upper cooling roller 71 and the adjustment roller 72 a number of times. The adjustment roller 72 is coupled to the support plate 32 and movable in the vertical direction. The festoon device 70 adjusts the length of the steel wire 100 wound around the upper cooling roller 71 and the adjustment roller 72 by moving the adjustment roller 72 in the vertical direction. The feed device 20 sends the steel wire 100 to the rubber coating device 30 at a constant speed. When a predetermined amount of the steel wire 100 is wound around the former 80, the former 80 temporarily stops winding the steel wire 100 and removes the wound steel wire 100. The festoon device 70 adjusts the length of the steel wire 100 wound around the upper cooling roller 71 and the adjustment roller 72 to adjust the amount of the steel wire 100 sent from the rubber coating device 30 and the amount of the steel wire 100 sent to the former 80.

The operation of the rubber coating device 30 will now be described.

A conventional rubber coating device heats the steel wire 100 using an electromagnetic induction heating coil. This generates magnetic flux at the coil. The magnetic flux generates eddy current in the steel wire 100 and heats the steel wire 100. An increase in the eddy current generated in the steel wire 100 increases the temperature of the steel wire 100. Further, as the time increases during which the steel wire 100 is exposed to the magnetic flux such as when the feeding of the steel wire 100 temporarily stops, the temperature of the steel wire 100 increases. Thus, the temperature of the steel wire 100 may become excessively high. This may make it difficult to set the temperature of the steel wire 100 to a predetermined temperature range.

Another conventional rubber coating device heats the steel wire 100 using a coil heater. In this case, the heat generated by the coil heater is transferred to the steel wire 100. As the amount of current supplied to the coil heater and the activation time of the coil heater increase, the temperature of the coil heater increases. Thus, the temperature of the steel wire 100 increases together with the temperature of the coil heater. As a result, it is difficult to set the temperature of the steel wire 100 to a predetermined temperature range. Further, when the temperature of the coil heater increases or decreases excessively, the amount of current supplied to the coil heater is changed to change the temperature of the coil heater. In this case, it takes time for the temperature of the coil heater to change from when the amount of current supplied to the coil heater is changed. Accordingly, it takes time to change the temperature of the steel wire 100, and it is difficult to set the temperature of the steel wire 100 to a predetermined temperature range.

A further conventional rubber coating device measures the rubber coating diameter of the steel wire 100 to control heating of the steel wire 100 in accordance with the measurement result. In this case, even when the temperature of the steel wire 100 exceeds the suitable range, the temperature of the steel wire 100 is controlled only when the rubber coating diameter changes. Thus, for example, when the feeding of the steel wire 100 temporarily stops, the temperature of the steel wire 100 increases excessively. Accordingly, it is difficult to maintain the temperature of the steel wire 100 in a suitable range.

In the rubber coating device 30, the heating device 50 heats water to a predetermined temperature range. The water transfers heat through the heat transfer rollers 40A and 40B to the steel wire 100. That is, the steel wire 100 is heated in a range that does not exceed the temperature of the water. This allows the temperature of the steel wire 100 to be easily maintained in a suitable range.

The embodiment has the advantages described below.

(1) In the rubber coating device 30, the steel wire 100 is heated in a range that does not exceed the temperature of water. This allows the temperature of the steel wire 100 to be easily maintained in a suitable range. Further, the heating device 50 heats water to a predetermined temperature range. Thus, the structure of the rubber coating device 30 is simpler than the structure using a temperature sensor measuring the temperature of the steel wire 100.

When an electromagnetic induction heating coil or a coil heater is arranged in each of the heat transfer rollers 40A and 40B, which are rotors, like in the conventional rubber coating device, the coil rotates with the heat transfer rollers 40A and 40B. Thus, a slip ring or the like is needed to activate the coil. This complicates the structure of the device. The rubber coating device 30 heats the steel wire 100 using water and thus simplifies the structure of heating the steel wire 100.

(2) The heat medium used to heat the steel wire 100 is water. The steel wire 100 is maintained in a temperature range including the boiling point of water. Thus, in the heating device 50, the temperature of water does not become higher than the boiling point even when the heat amount applied to the water exceeds the heat amount needed to boil water. This allows the temperature of water to be easily maintained in a predetermined temperature range and allows the temperature of the steel wire 100 to be easily maintained.

(3) The water in the heating chamber 47 moves through the supply passage 45A and the discharge passage 46A between the heat transfer rollers 40A and 40B and the outside of the heat transfer rollers 40A and 40B. This moves water in the heating chamber 47. Thus, the concentration of heat is limited in the heating chamber 47.

(4) The discharge passage 46A is located at the outer side of the supply passage 45A. Thus, the water in the discharge passage 46A limits decreases in the temperature of water in the supply passage 45A. This limits decreases in the temperature of water supplied to the heating chamber 47.

(5) The partition plate 43 partitions the heating chamber 47 into the first heating chamber 48 and the second heating chamber 49. This defines a water passage in the heating chamber 47. Thus, the concentration of heat is further limited in the heating chamber 47. Further, the outer circumferential portion of the first heating chamber 48 is in communication with the outer circumferential portion of the second heating chamber 49. Thus, the water passage is located near the grooves 42. This allows the heat of water to be easily transferred to the proximity of the grooves 42. Accordingly, the steel wire 100 wound around the grooves 42 is heated efficiently.

(6) The steel wire 100 is wound around the two heat transfer rollers 40A and 40B. This increases the contact area of the steel wire 100 and the heat transfer rollers 40A and 40B. Thus, the heat of the transfer rollers 40A and 40B is sufficiently transferred to the steel wire 100. This allows the temperature of the steel wire 100 to sufficiently increase to near the temperature of water.

The above embodiment may be modified as follows.

The heat medium may be changed to a fluid other than water.

A temperature sensor that measures the temperature of water may be added to control the amount of current supplied to the heater 52 in accordance with the measurement result of the temperature sensor.

The heater 52 may be arranged in the heating chamber 47 to directly heat the water in the heating chamber 47. In this case, the supply passage 45A and the discharge passage 46A may be omitted.

There may be only one of the heat transfer rollers 40A and 40B.

The supply passage 45A may be located at the outer side of the discharge passage 46A. More specifically, the inner portion of the supply pipe 45 may be the discharge passage 46A, and the portion between the discharge bore 46 and the supply pipe 45 may be the supply passage 45A.

The heat transfer rollers 40A and 40B may be plate-shaped heat transfer members in which the heating chamber 47 is arranged. In this case, the steel wire 100 is in contact with the surface of the plate-shaped heat transfer members.

DESCRIPTION OF REFERENCE CHARACTERS

30: rubber coating device
40A: first heat transfer roller (heat transfer member)
40B: second heat transfer roller (heat transfer member)
41: rotation shaft
42: groove
43: partition plate
45A: supply passage
46A: discharge passage
47: heating chamber (space for heat medium)
48: first heating chamber
49: second heating chamber
50: heating device
60: extrusion machine
100: steel wire

The invention claimed is:

1. A rubber coating device for a steel wire, the rubber coating device comprising:
a heating device that heats a heat medium to a predetermined temperature range;
a heat transfer roller that is in contact with a steel wire, wherein the heat transfer roller includes a space for the heat medium; and
an extrusion machine that coats the steel wire heated by the heat transfer roller with rubber, wherein
the heat medium is water,
the predetermined temperature range includes a boiling point of the heat medium,
the heat transfer roller includes an outer circumferential surface including a groove around which the steel wire is wound,
the heat transfer roller includes a rotation shaft, and
a supply passage that supplies the heat medium to the space for the heat medium in the heat transfer roller and a discharge passage that discharges the heat medium out of the space for the heat medium are included inside the rotation shaft.

2. The rubber coating device according to claim 1, wherein the supply passage is located at an inner side of the discharge passage inside the rotation shaft.

3. The rubber coating device according to claim 2, wherein
- the heat transfer roller includes a circular partition plate concentric to the heat transfer roller in the space for the heat medium,
- the partition plate partitions the space for the heat medium into a first heating chamber connected to the supply passage and a second heat chamber connected to the discharge passage, and
- an outer circumferential portion of the first heating chamber is in communication with an outer circumferential portion of the second heating chamber.

4. The rubber coating device according to claim 1, wherein
- the heat transfer roller includes a first heat transfer roller and a second heat transfer roller, and
- the steel wire is wound around the first heat transfer roller and the second heat transfer roller a number of times.

\* \* \* \* \*